06-457
/23/87 XR RE 32,443 SR

United States Patent [19]

Kalal

[11] E Patent Number: Re. 32,443

[45] Reissued Date of Patent: Jun. 23, 1987

[54] PACKAGE AND DISPLAY SYSTEM

[75] Inventor: John D. Kalal, Akron, Ohio

[73] Assignee: Schott International, Inc., Akron, Ohio

[21] Appl. No.: 868,957

[22] Filed: May 30, 1986

Related U.S. Patent Documents

Reissue of:

[64] Patent No.: 4,456,122
Issued: Jun. 26, 1984
Appl. No.: 451,085
Filed: Dec. 20, 1982

[51] Int. Cl.[4] ..... B65D 75/30

[52] U.S. Cl. ..... 206/45.31; 206/44.11; 206/348; 206/457; 206/459; 206/466; 206/806; 383/92; 383/106

[58] Field of Search ..... 206/45.11, 45.34, 348, 206/457, 459, 466, 44.11, 806, 458, 45.33; 383/92, 106

[56] References Cited

U.S. PATENT DOCUMENTS

| | | | |
|---|---|---|---|
| 911,647 | 2/1909 | Dougherty | 206/44.11 |
| 1,118,824 | 11/1914 | Spiry | 206/44.11 |
| 1,688,101 | 10/1928 | Ackerman | 206/493 |
| 1,922,969 | 8/1933 | MacColl | 206/410 |
| 2,560,932 | 7/1951 | Chapman et al. | 206/466 |
| 2,612,260 | 9/1952 | Schoenhut | 206/44.11 |
| 3,172,531 | 3/1965 | Shillman | 206/45.34 |
| 3,281,056 | 10/1966 | Kugler | 206/449 |
| 3,430,364 | 3/1969 | Kirschbaum et al. | 206/457 |
| 3,690,448 | 9/1972 | Switzer | 206/45.33 |
| 3,765,597 | 10/1973 | Brieske | 206/45.34 |
| 3,828,856 | 8/1974 | Wallis | 206/527 |
| 4,373,632 | 2/1983 | Van Zandt | 206/457 |

*Primary Examiner*—William Price
*Assistant Examiner*—Brenda J. Ehrhardt
*Attorney, Agent, or Firm*—Reese Taylor

[57] ABSTRACT

A combined package and display system for fabric goods includes a transparent or translucent polyethylene package, heat sealed or otherwise secured about its periphery, containing the goods and suitable advertising material. Where the product is, for example, a tarpaulin, also of polyethylene and having grommets about its periphery, and the package is formed so that its top edge is constructed as a means for attachment to a supporting surface and contains grommets of similar material and strength as those contained in the product itself. In this way, the package can be mounted for display purposes by its grommets, while the nature and quality of the grommets of the goods can be tangibly observed and felt by the prospective purchaser. Also secured, and displayed exteriorly by one of the package grommets, to the top edge of the package is a sample of the product itself, so that the actual product being sold is well protected when displayed for sale while permitting the prospective purchaser to tangibly test and feed the nature and character of the product.

6 Claims, 3 Drawing Figures

PACKAGE AND DISPLAY SYSTEM

Matter enclosed in heavy brackets [ ] appears in the original patent but forms no part of this reissue specification; matter printed in italics indicates the additions made by reissue.

FIELD OF THE INVENTION

This invention relates, in general, to the retail packaging of products and relates, in particular, to a unique retail package for tarpaulins or other products of similar nature.

DESCRIPTION OF THE PRIOR ART

In the retail trade there are, of course, many ways of display products for sale. Considering the particular product which is the subject of the preferred form of this invention, i.e., tarpaulins, the tarpaulins may be displayed simply unpackaged or "by themselves" on a counter or shelf. This method of display enables the prospective purchaser to feel and handle the tarpaulin so as to obtain some impression as to its strength and the characteristics and the nature of the product. The diasdvantage of this display method is that it is rather difficult to attach any advertising material to the product and, also, the product is subject to soiling or other damage by indiscriminate handling prior to its final sale.

Another method which is commonly used is to package articles, including tarpaulins, in clear bags or packages of polyethylene or similar transparent or translucent material. This enables the prospective purchaser to view the goods but also protects the product from soiling or other damage. The disadvantage with this approach here, of course, is that the prospective purchaser is unable to handle or feel the actual product so as to ascertain to his own satisfaction the nature and character of the product.

SUMMARY OF THE INVENTION

It has been found that the advantages of both of the types of display and packaging just described can be achieved while eliminating the disadvantages of both by providing a unique packaging and display system.

Accordingly, it has been discovered that the product, such as for example the tarpaulin referred to above, can be packaged in a transparent or translucent polyethylene package, heat sealed or otherwise secured about its edges to effectively protect the product when displayed for retail sale, as well as during shipping and handling. Such a package renders the product visible to the prospective purchaser, and also makes it possible to insert advertising material which is also visible to the prospective purchaser.

It has further been found that if grommets of the type normally found in a tarpaulin are mounted on the top edge of the package, that the prospective purchaser is able to ascertain the quality of the product grommets without actually handling the tarpaulin itself. These grommets also, of course, serve as a means for hanging or otherwise mounting the overall package for display purposes.

It has further been found that a sample piece of the material of which the tarpaulin is manufactured can be sealed to the one edge of the package by one of the grommets, thereby enabling the prospective purchaser to handle and ascertain the nature of the product without actually damaging or soiling the product itself.

Accordingly, production of an improved package and display system of the character above-described becomes the principal object of this invention, with other objects thereof becoming more apparent upon a reading of the following brief specification, considered and interpreted in view of the accompanying drawings.

OF THE DRAWINGS

BRIEF DESCRIPTION OF THE PREFERRED EMBODIMENT

Figure 1:
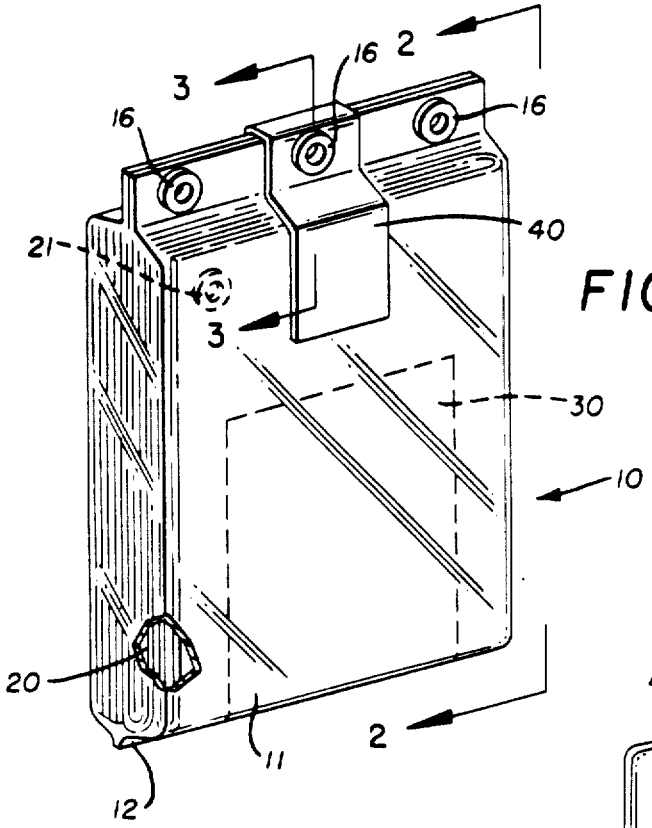
FIG. 1 is a perspective view of the improved package.
Figure 2:
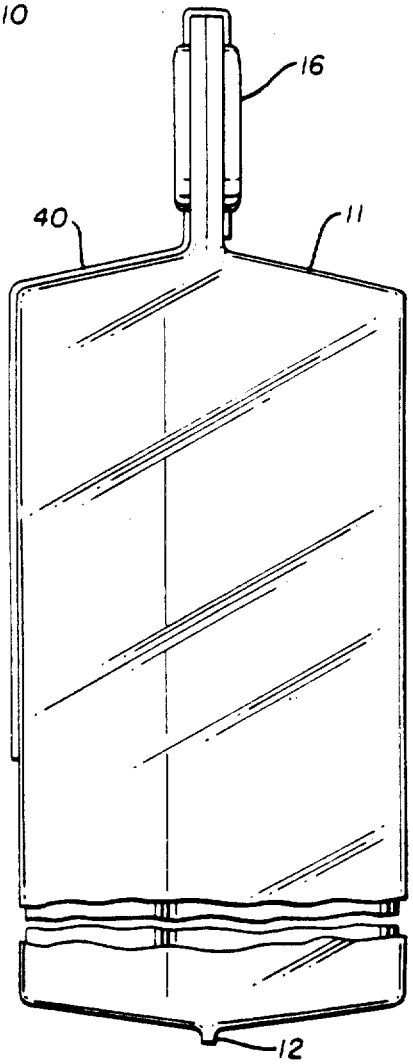
FIG. 2 is an enlarged end elevational view taken along the line 2—2 of FIG. 1.

Referring first then to FIG. 1, the improved package and display combination generally indicated by the numeral 10, includes a transparent or translucent polyethylene bag 11 within which the product 20, which in this case is a tarpaulin, can be displayed. The bag is preferably an extruded tube, heat sealed or otherwise secured along its bottom edge 12 with an open top.

The top edges 13 and 14, which are extensions of the walls of the bag, are folded over reinforcing or stiffening bars 15,15 with the laminate thus formed being secured together by a plurality of grommets 16 which are of the same nature, strength and quality as the grommets 21 of the tarpaulin 20 itself. In the preferred form of the invention, they are, in fact, identical.

The product 20 is illustrated as being a tarpaulin consisting of a sheet of material having a plurality of grommets 21 along at least one edge and folded for insertion into the package or bag 11.

Also received within the bag 11 is advertising material 30 which is readily visible to the prospective purchaser through the package from the front or rear or both.

Figure 3:
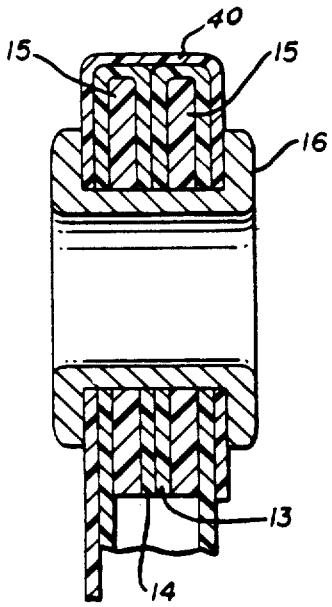
FIG. 3 is a partial, enlarged section view taken along the line 3—3 of FIG. 1.

Secured at the top edge of bag 11 by one of the grommets 16, is a sample 40 of the tarpaulin material. The sample 40 is folded over the top of top edges 13 and 14 and secured as can readily be seen in FIG. 3. This material is thus accessible to the prospective purchaser.

The system thus accomplishes several objects.

First, a secure package 10 is provided so that the product 20 is protected during storage, shipping and display against soiling or other damage.

Second, the product 20 is readily visible to the prospective purchaser so that its aesthetic qualities such as, for example, color, texture, etc., can be readily ascertained.

Third, due to the disposition of sample 40, the physical characteristics of the product 20 such as strength, etc., can be ascertained by the purchaser without damage to the product.

Fourth, advertising material 30 can easily be displayed with the product without detracting from the other advantages of the system and without any deterioration or damage thereto during shipping, storage, and display.

While a full and complete description of the invention has been set forth in accordance with the dictates of the Patent Statutes, it should be understood that modifications can be resorted to without departing from the spirit hereof or the scope of the appended claims.

For example, the invention has been illustrated and described in its preferred embodiment with the product 20 being a tarpaulin, but the inventive principles of the system are believed to be adaptable to the display of similar goods as well.

Also, while certain specific materials, such as polyethylene, have been referred to herein, other materials having similar characteristics and properties can be employed.

Finally, the bottom edge of bag 11 has been described as being heat sealed but it should be understood that other methods of closing the package can be employed.

What is claimed is:

1. A package system for fabric goods having a plurality of grommet reinforced openings along at least one edge, comprising:

(A) a transparent cover enveloping the goods;

(B) said cover being closed along its edges and forming a support section along at least one of said edges;

(C) a plurality of grommet reinforced openings in said support section;

(D) said openings being reinforced by grommets of the same size and physical properties as the grommets of the goods; and (E) a strip of the same material as the goods being secured to said cover at one of said reinforced openings thereof and disposed exteriorly of said cover.

2. The package system of claim 1 wherein said strip of material is secured to said cover by one of said grommets.

3. The package system of claim 1 wherein information imparting material is disposed interiorly of said cover between said cover and said goods.

*4. A package system for fabric goods having at least one grommet reinforced opening in at least one edge, comprising:*

*(A) a transparent cover enveloping the goods;*

*(B) said cover being closed adjacent its edges and forming a support section along at least one of said edges;*

*(C) at least one grommet reinforced opening in said support section;*

*(D) said opening being reinforced by a grommet of substantially the same size and physical properties as the grommet of the goods; and*

*(E) a strip of the same material as the goods being secured to said cover at said reinforced opening thereof and disposed exteriorly of said cover.*

*5. The package system of claim 4 wherein said strip of material is secured to said cover by said grommet in said support section.*

*6. The package system of claim 4 wherein information imparting material is disposed interiorly of said cover, between said cover and said goods.*

* * * * *